(12) United States Patent
Ichihashi

(10) Patent No.: US 12,058,290 B2
(45) Date of Patent: Aug. 6, 2024

(54) INSPECTION APPARATUS, METHOD FOR CONTROLLING THE SAME, AND STORAGE MEDIUM

(71) Applicant: CANON KABUSHIKI KAISHA, Tokyo (JP)

(72) Inventor: Yukichika Ichihashi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/343,314

(22) Filed: Jun. 28, 2023

(65) Prior Publication Data
US 2024/0015251 A1    Jan. 11, 2024

(30) Foreign Application Priority Data
Jul. 11, 2022 (JP) .................. 2022-111341

(51) Int. Cl.
| | | |
|---|---|---|
| H04N 1/00 | (2006.01) | |
| G06F 3/14 | (2006.01) | |
| G06T 5/50 | (2006.01) | |
| G06T 7/00 | (2017.01) | |
| G06T 7/13 | (2017.01) | |
| G06V 10/25 | (2022.01) | |
| G06V 10/44 | (2022.01) | |

(52) U.S. Cl.
CPC .......... *H04N 1/00045* (2013.01); *G06F 3/14* (2013.01); *G06T 5/50* (2013.01); *G06T 7/0002* (2013.01); *G06T 7/13* (2017.01); *G06V 10/25* (2022.01); *G06V 10/44* (2022.01); *G06T 2207/20221* (2013.01); *G06T 2207/30144* (2013.01)

(58) Field of Classification Search
None
See application file for complete search history.

(56) References Cited

U.S. PATENT DOCUMENTS

| | | |
|---|---|---|
| 2020/0096925 A1 | 3/2020 | Ikuta |
| 2020/0336605 A1 | 10/2020 | Kawasaki |
| 2021/0256677 A1 | 8/2021 | Kobashi |
| 2021/0264581 A1 | 8/2021 | Ishii et al. |

FOREIGN PATENT DOCUMENTS

JP    2021130219 A    9/2021

OTHER PUBLICATIONS

Extended European search report issued in European Appln. No. 23183870.7, mailed on Dec. 1, 2023.

*Primary Examiner* — Lennin R Rodriguezgonzalez
(74) *Attorney, Agent, or Firm* — ROSSI, KIMMS & McDOWELL LLP

(57) ABSTRACT

The present invention directs to an inspection apparatus, comprising: an obtaining unit that obtains a correct image for comparison against an inspection target image read from a print sheet; a first extraction unit that extracts a first coordinate group indicating an outside edge of the correct image from a feature point of the correct image; and a second extraction unit that extracts a second coordinate group indicating an inspection region inside the correct image that does not include the extracted first coordinate group of the correct image.

14 Claims, 13 Drawing Sheets

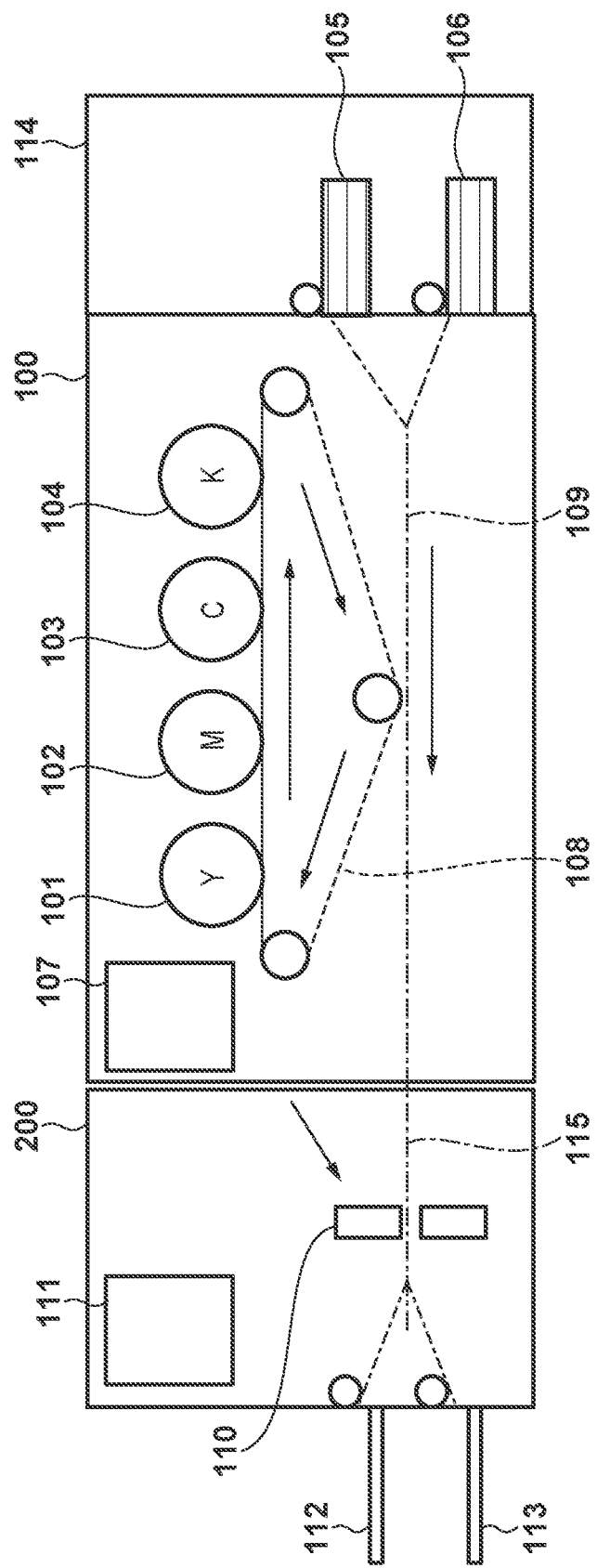

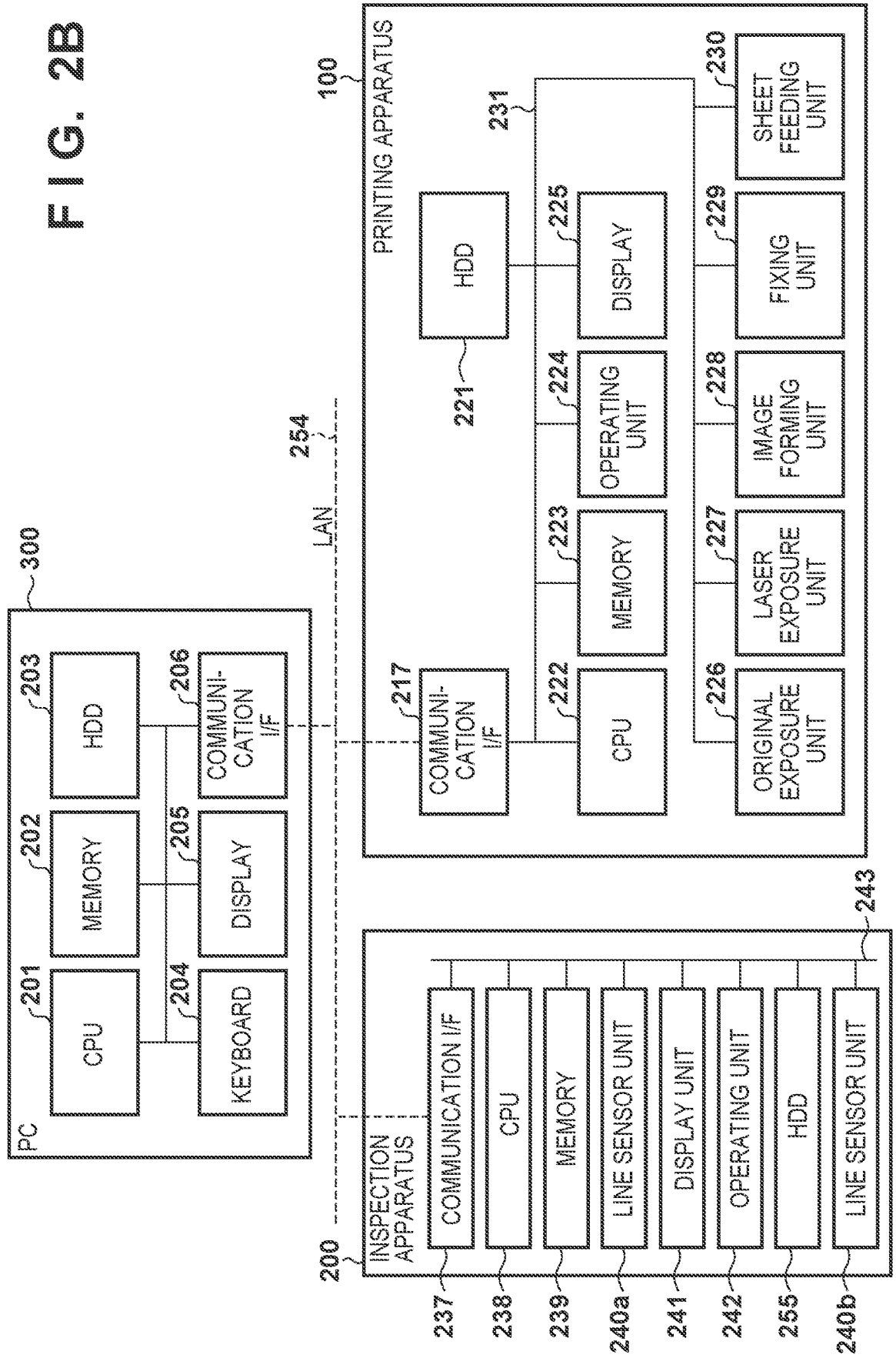

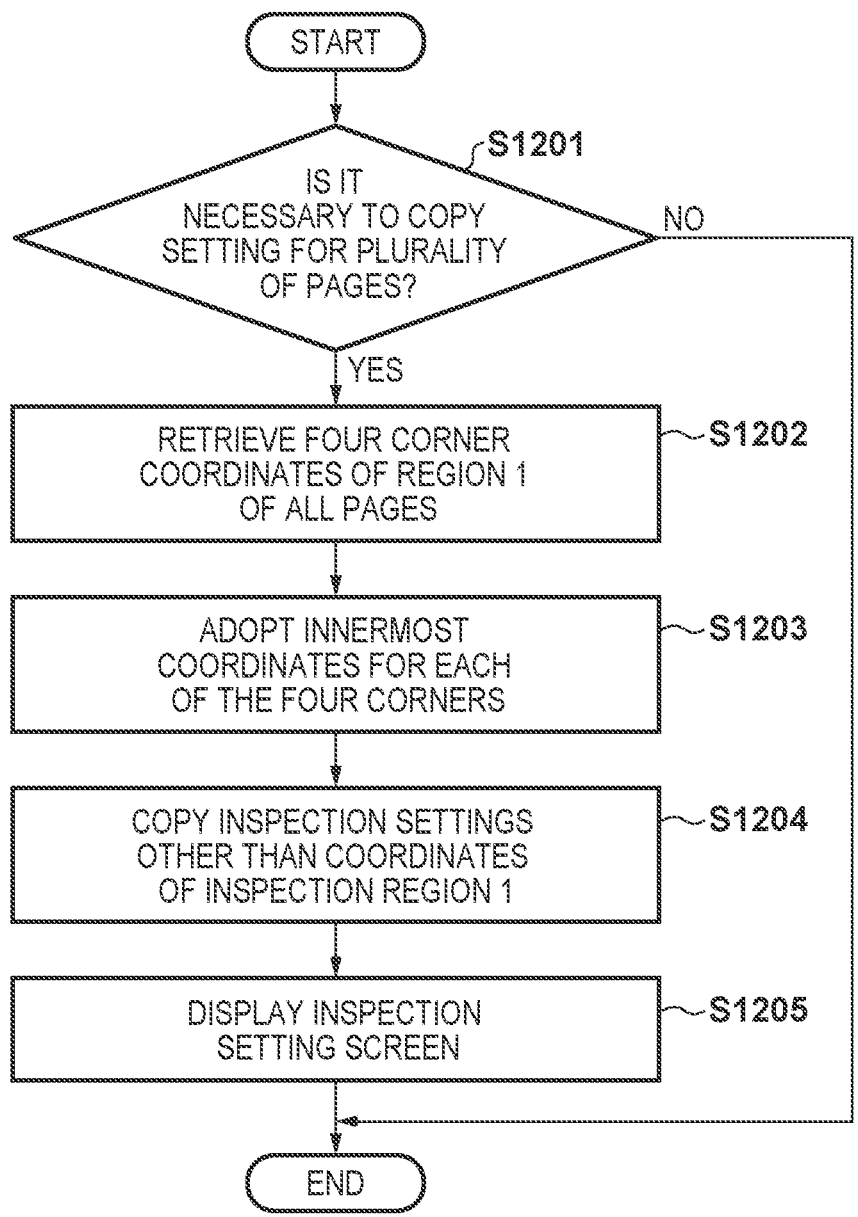

INSPECTION APPARATUS, METHOD FOR CONTROLLING THE SAME, AND STORAGE MEDIUM

BACKGROUND OF THE INVENTION

Field of the Invention

The present invention relates to an inspection apparatus for inspecting a product, a method for controlling the same, and a storage medium

Description of the Related Art

Conventionally, in an inspection of image quality of printed material, it is common for an operator to visually confirm the printed material. Therefore, the inspection depends on a subjective evaluation by a worker, and there is a possibility that variation will occur in the level of the inspection. In addition, the inspection time depends on the skill of the worker, and there is a limit to how much the inspection time can be shortened because the inspection relies on manpower. So, in recent years, inspection apparatuses that perform automatic inspection for inspecting image quality of printed materials have been proposed.

In determinations made by an inspection apparatus, original image data generated in the printing apparatus or scan data obtained by reading, in a scanner of the inspection apparatus, a print sheet that has been printed by proof printing is generally used as a correct image. The operator uses a UI of an attached personal computer or apparatus to specify a region to be inspected in the correct image data by using a mouse or a touch panel. Then, scan data obtained by reading the normally printed inspection target original image by the scanner of the inspection apparatus is used as inspection image data, and the inspection region designated as the correct image is compared with the correct image data. Such setting of an inspection region is a complicated operation, and there is a desire to simplify the operation. For example, in Japanese Patent Laid-Open No. 2021-130219A, inspection setting is performed simply by partially automating the correct image inspection region setting.

As an inspection region, it is necessary to inspect the entire paper surface including the blank paper of the background in consideration of dirt and the like. However, when the entire print sheet is inspected, if the edge portion of the print sheet is included in the inspection region, overdetection occurs. This is because, for example, in the case of a thin print sheet, it is difficult to align edge portions of the print sheet due to floating of the print sheet at the time of reading the inspection target image. Also, it is because cases of a thick print sheet are prone to optical effects due to shadows depending on the direction of a light source, light wrapping, or the like when reading an original. Meanwhile, when an attempt is made to adjust the inspection region inside the edge of the print sheet, it is difficult to manually set the inspection region while maximizing the inspection region since the inspection target image actually has a distortion.

SUMMARY OF THE INVENTION

The present invention enables realization of a system for performing setting so as to avoid overdetection while expanding an inspection region on an image when inspecting a printed material.

One aspect of the present invention provides an inspection apparatus, comprising: an obtaining unit that obtains a correct image for comparison against an inspection target image read from a print sheet; a first extraction unit that extracts a first coordinate group indicating an outside edge of the correct image from a feature point of the correct image; and a second extraction unit that extracts a second coordinate group indicating an inspection region inside the correct image that does not include the extracted first coordinate group of the correct image.

Another aspect of the present invention provides a method for controlling an inspection apparatus, the method comprising: obtaining a correct image for comparison against an inspection target image read from a print sheet; extracting a first coordinate group indicating an outside edge of the correct image from a feature point of the correct image; and extracting a second coordinate group indicating an inspection region inside the correct image that does not include a coordinate of the extracted first coordinate group of the correct image.

Still another aspect of the present invention provides a non-transitory computer-readable storage medium storing a program for causing a computer to execute each step of a method for controlling an inspection apparatus, the method comprising: obtaining a correct image for comparison against an inspection target image read from a print sheet; extracting a first coordinate group indicating an outside edge of the correct image from a feature point of the correct image; and extracting a second coordinate group indicating an inspection region inside the correct image that does not include a pair of coordinates of the extracted first coordinate group of the correct image.

Further features of the present invention will be apparent from the following description of exemplary embodiments with reference to the attached drawings.

BRIEF DESCRIPTION OF THE DRAWINGS

FIG. 2A is a diagram illustrating a printing apparatus and an inspection apparatus according to an embodiment.

FIG. 2B is a diagram illustrating a control configuration of a system according to an embodiment.

FIG. 8 is a flowchart illustrating a processing procedure of an inspection setting copy according to the embodiment.

DESCRIPTION OF THE EMBODIMENTS

Figure 1:
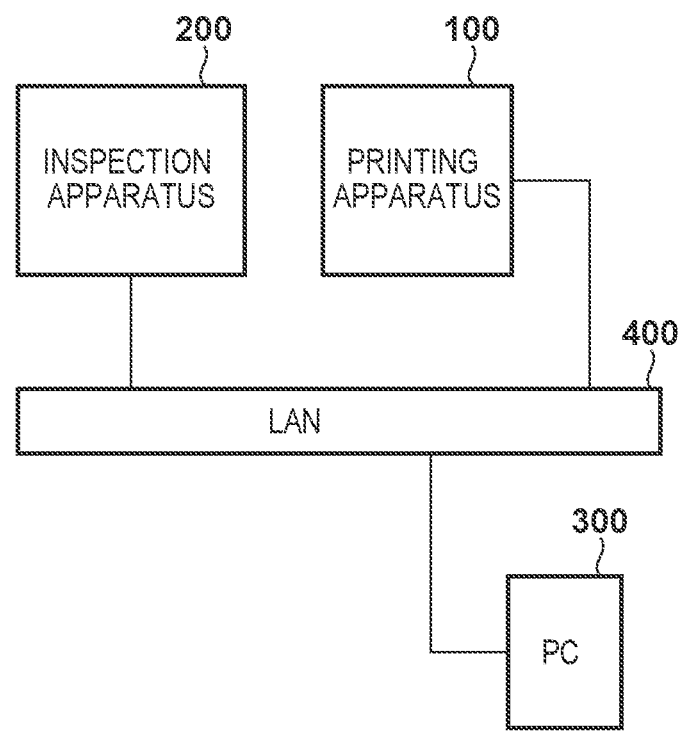
FIG. 1 is a schematic diagram illustrating an overall configuration of a system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Hereinafter, an embodiment of the present invention will be described. Unless otherwise specified, the present invention can be applied to a single apparatus or an inspection apparatus including a plurality of devices as long as the functions according to the present invention are realized. Further, unless otherwise specified, so long as the functions of the present invention are realized, the present invention may be applied to an inspection apparatus that is connected via a network such as Local Area Network (LAN), Wide Area Network (WAN), and the like, and on which processing is performed. That is, a system configuration in which the various terminals described in the following embodiments are connected is only one example, and it is needless to say that various configurations are possible depending on the application and the purpose. For example, although a configuration is described below in which an inspection apparatus 200 is provided with a reading unit that reads an inspection target printed material, a reading unit may be separately provided, and the inspection apparatus may be implemented as an information processing apparatus connected thereto via a network.

<Overall System Configuration>

First, an overall configuration of a printed material inspection system according to the present embodiment will be described with reference to FIG. 1. A PC (personal computer) 300 is connected to a printing apparatus 100 by a LAN 400. Furthermore, the inspection apparatus 200 is connected to the LAN 400. In the present embodiment, the inspection apparatus 200 is directly connected to the printing apparatus 100 and can transmit and receive commands without going through the PC 300 or the LAN 400. In addition, the printing apparatus 100 and the inspection apparatus 200 are connected to each other so that a medium, which is a printed material, can be directly conveyed therebetween.

The PC 300 can instruct the printing apparatus 100 to execute a print job, and can instruct the inspection apparatus 200 to execute an inspection job. Note that the PC 300 can instruct the printing apparatus 100 to execute a print job and an inspection job for the printed material thereof, and the printing apparatus 100 can notify the inspection apparatus 200 of an instruction for the inspection job. Further, in the present embodiment, an example of a system configuration including a single PC 300 is given, but of course more PCs may be connected to the LAN 400 and a PC that is accessible from an external network may be included in the system configuration.

<Configuration of Printing Apparatus and Inspection Apparatus>

Next, referring to FIG. 2A, a detailed configuration example of the printing apparatus 100 and the inspection apparatus 200 will be described. Reference numerals 101 to 104 denote image forming stations that perform color printing of yellow, magenta, cyan, and black. For each of the image forming stations 101 to 104, an image forming method such as an electrophotographic method or an ink jet method is conceivable, but the present invention is not limited thereto, and any image forming method can be applied. It is also possible to implement monochromatic printing, for example, with a configuration of only the black station 104. The printing apparatus 100 includes a controller board 107, and a CPU, which will be described later, and can realize various kinds of control by reading and executing a program stored in the storage device. The inspection apparatus 200 includes a controller board 111, and a CPU, which will be described later, and can realize various kinds of control by reading and executing a program stored in the storage device.

A sheet feeding device 114 includes a plurality of sheet feeding stages, and includes, for example, sheet feeding units 105 and 106 in which pre-printed sheets are placed. Different types of sheets can be stacked in the sheet feeding units 105 and 106. An intermediate transfer belt 108 is rotated clockwise in the figure, and the respective color materials are transferred thereto from the image forming stations 101 to 104. Further, the color material on the intermediate transfer belt 108 is transferred to the medium on a sheet conveyance path 109 at a contact portion with the medium which is conveyed toward the downstream side.

The printing apparatus 100 and the inspection apparatus 200 are connected to a sheet conveyance path 109, and the printed medium is directly conveyed to a sheet conveyance path 115 in the inspection apparatus 200. The image sensor 110 captures both front and back surfaces of the medium on the sheet conveyance path 115, and correct images of the printed material are registered and inspected. The inspection results are sorted into the sheet discharging units 112 and 113. For example, a printed material having a good inspection result is discharged to the discharge unit 112, and a printed material having a bad inspection result is discharged to the discharge unit 113 for purging.

<Detailed Configuration of Each Device>

Next, a detailed configuration of apparatuses according to the present embodiment will be described with reference to FIG. 2B. A configuration of the printing apparatus 100 will be described. The printing apparatus 100 includes a communication OF 217, an HDD 221, a CPU 222, a memory 223, an operating unit 224, and a display 225. Further, the printing apparatus 100 includes an original exposure unit 226, a laser exposure unit 227, an image forming unit 228, a fixing unit 229, and a sheet feeding unit 230. The respective components are connected to each other via a system bus 231 and can exchange data. Here, an electrophotographic printing apparatus will be described as an example of the printing apparatus 100. However, as described above, any method may be used for the image forming method.

The communication OF 217 is connected to the inspection apparatus 200 and the PC 300 via a LAN 254, and controls communication with the respective devices. The HDD 221 is a storage device that stores programs and data. The CPU 222 comprehensively performs image processing control and print control based on programs and the like stored in the HDD 221. The memory 223 stores programs and image data that are required when the CPU 222 performs various processes, and operates as a work area. The operation unit 224 receives an input of various settings and instruction of operations from a user. The display 225 displays setting information of the image processing apparatus, a processing status of the print job, and the like.

The original exposure unit 226 performs a process of reading an original when using a copy function or a scan function. The original exposure unit 226 reads original data by a CMOS image sensor capturing an image of a sheet placed by a user while illuminating an exposure lamp. The laser exposure unit 227 is a device that performs primary charging for irradiating a photosensitive drum with a laser beam and laser exposure for transferring a toner image. The laser exposure unit 227 first performs primary charging for charging the surface of the photosensitive drum to a uniform negative potential. Next, the laser beam is irradiated onto the photosensitive drum by the laser driver while adjusting the reflection angle by the polygon mirror. As a result, the negative charge of the irradiated portion is neutralized, and an electrostatic latent image is formed.

The image forming unit 228 is a device for transferring toner to a sheet; includes a developing unit, a transfer unit, a toner supply unit, and the like; and transfers toner on a photosensitive drum to the sheet. In the developing unit, visualization is performed by causing toner that is negatively charged to adhere to an electrostatic latent image on the surface of the photosensitive drum from a developing cylinder. In the transfer unit, a primary transfer is performed in which a positive potential is applied to a primary transfer roller and the toner on the surface of the photosensitive drum is transferred to the transfer belt, and a secondary transfer is performed in which a positive potential is applied to a secondary outer transfer roller and the toner on the transfer belt is transferred to the sheet. The fixing unit 229 is a device for melting the toner on the sheet and fixing it to the sheet by heat and pressure, and includes a heater, a fixing belt, a pressure belt, and the like. The sheet feeding unit 230 is a device for feeding a sheet, and a sheet feeding operation and a conveyance operation of the sheet are controlled by rollers and various sensors.

A configuration of the inspection apparatus 200 will next be described. The inspection apparatus 200 includes a communication OF 237, a CPU 238, a memory 239, a line sensor unit 240, a display unit 241, an operation unit 242, and an HDD 255, and each component is connected via a system bus 243. The communication OF 237 is connected to the printing apparatus 100 and the PC 300 via the LAN 254, and performs communication necessary for control. The CPU 238 performs various controls required for inspection in accordance with a control program stored in the memory 239. The memory 239 is a storage device in which a control program is stored. The line sensor units 240a and 240b correspond to the image sensor 110 and capture a conveyed sheet based on an instruction from the CPU 238. The CPU 238 stores an image captured by the line sensor units 240a and 240b as an inspection image in the memory 239. Further, the CPU 238 compares the inspection image captured by the line sensor units 240a and 240b with the correct image stored in the memory 239 to determine whether the printed image is normal. An inspection result, a setting screen, and the like are displayed on the display unit 241. The operation unit 242 is operated by a user and receives an instruction such as a setting change of the inspection apparatus 200 or registration of a correct image. The HDD 255 stores various setting information and images required for inspection. The various stored setting information and images can be reused.

A configuration of the PC 300 will next be described. The PC 300 includes a CPU 201, a memory 202, an HDD 203, a keyboard 204, a display 205, and a communication OF 206, and is connected via a system bus 207. The CPU 201 executes print data generation and a print instruction based on a document processing program or the like stored in the HDD 203. The CPU 201 also comprehensively controls the devices connected to the system bus. The memory 202 stores programs and image data that are required when the CPU 201 performs various processes, and operates as a work area. The HDD 203 stores programs and data required for operations such as a print process. The keyboard 204 is a device for inputting an instruction to operate the PC 103. The display 205 displays information of an execution application on the PC 300 or the like based on a video signal of a still image or a moving image. The communication OF 206 is connected to an external LAN 104 and performs communication such as a print instruction and an inspection instruction.

In the present embodiment, each of the memory 202, the memory 223, and the memory 239 may be a storage device for holding data and programs. For example, each of the memories may be replaced with volatile RAM, non-volatile ROM, a built-in HDD, an external HDD, and a USB memory.

<Function Configuration>

Figure 3:
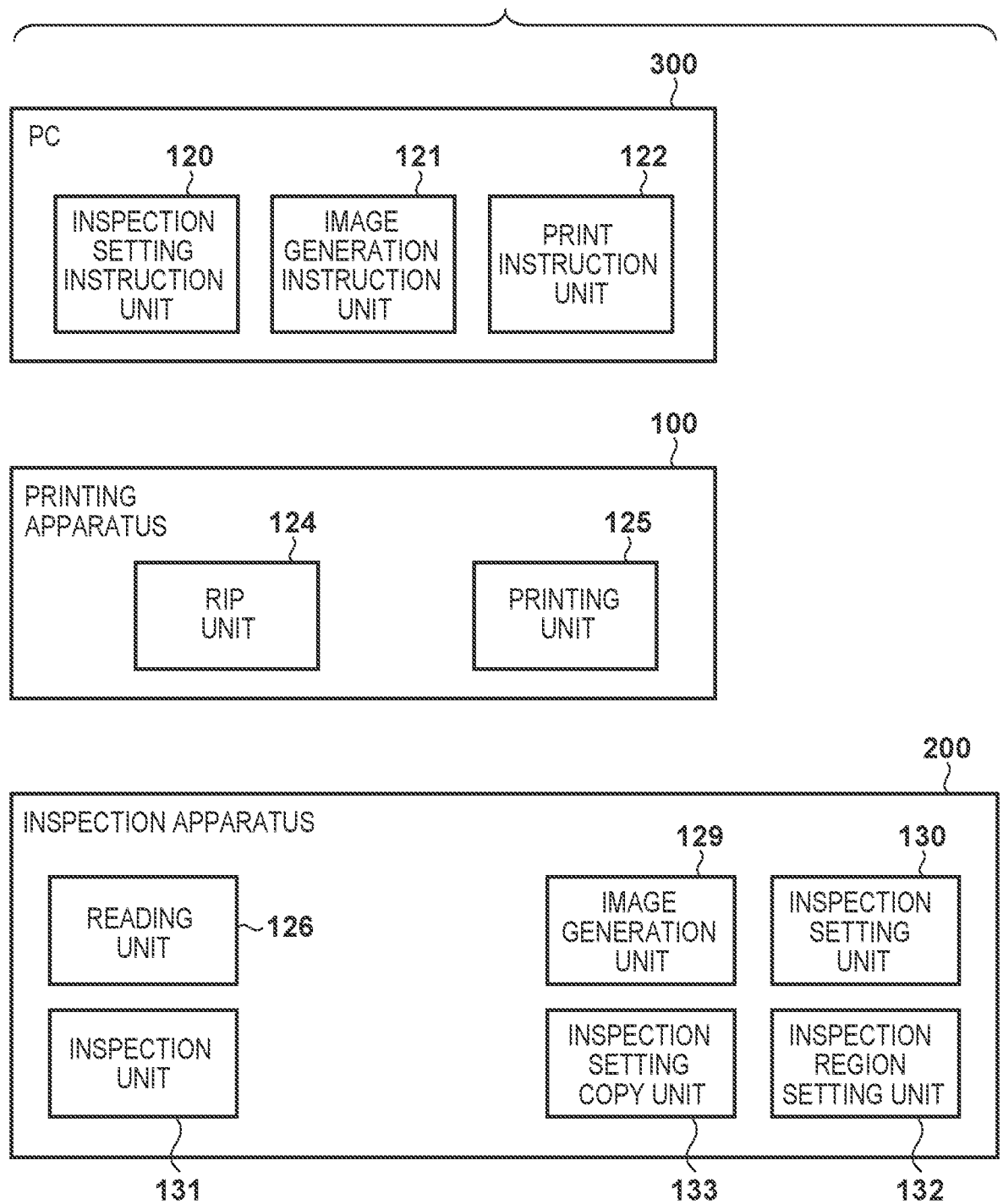
FIG. 3 is a diagram illustrating a functional configuration of each apparatus according to an embodiment.

Next, referring to FIG. 3, functional configurations of the printing apparatus 100, the inspection apparatus 200, and the PC 300 according to the present embodiment will be described. Each function is realized by each CPU reading and executing a program stored in each storage device. However, the present invention can also be realized by hardware using an ASIC or the like rather than by a program. The PC 300 is connected to a display 205, the keyboard 204, and a mouse (not shown), and the functions shown in FIG. 3 can be realized by pressing a button displayed on the display 205 by using the mouse. Note that the inspection apparatus 200 is provided with the operation unit 242, which may be a touch panel or the like. However, in the present embodiment, it is assumed that the CPU 238 of the inspection apparatus 200 has a function of generating Hypertext Markup Language (HTML) for a screen. Hypertext Transfer Protocol (HTTP) can also be used to enable display on the PC 300 and enable operations performed on the PC 300.

The PC 300 includes an inspection setting instruction unit 120, an image generation instruction unit 121, and a print instruction unit 122 as a functional configuration. The inspection setting instruction unit 120 receives a setting related to an inspection job by a user via a user interface of the PC 300, and instructs the printing apparatus 100 and the inspection apparatus 200. The image generation instruction unit 121 instructs the printing apparatus 100 and the inspection apparatus 200 to generate a correct image. The print instruction unit 122 instructs the printing apparatus 100 and the inspection apparatus 200 to execute a print job.

The printing apparatus 100 includes an RIP unit 124 and a printing unit 125 as a functional configuration. The raster image processor (RIP) 124 executes an RIP process when a print instruction is given. In RIP processing, image data such as PDF data is converted into a bitmap image, and an RIP image is generated and stored. The printing unit 125 reads a stored RIP image and executes a printing process.

The inspection apparatus 200 includes, as functional components, a reading unit 126, an image generation unit 129, an inspection setting unit 130, an inspection unit 131, an inspection region setting unit 132, and an inspection setting copy unit 133. In response to receiving an instruction from the print instruction unit 122, the reading unit 126 reads both sides of printed material printed by the printing apparatus 100 using the line sensor units 240a and 240b. The image generation unit 129 generates a correct image of an inspection target image. The image generation unit 129 generates a correct image by reading a printed material for generating a correct image using the line sensor units 240a and 240b. Alternatively, the image generation unit 129 may use an RIP image as a correct image when printing is performed by the printing apparatus 100. In the second embodiment, a case where an RIP image is made to be a correct image will be described in detail. The inspection setting unit 130 sets parameters related to inspection in accordance with a user operation on an inspection setting screen to be described later. The inspection region setting unit 132 sets an inspection region of an inspection target image read by the line sensor units 240a and 240b in accordance with a user operation on an inspection setting screen to be described later. The inspection setting copy unit 133 copies the inspection region set by the inspection region setting unit 132 and stores the copied inspection region in a memory or the like. The inspection unit 131 compares the inspection target image with the correct image in accordance with the setting contents set by the inspection setting unit 130 and the inspection region setting unit 132, and thereby performs the inspection.

<Inspection Sequence>

(Procedure for Generating Correct Image)

Figure 4:
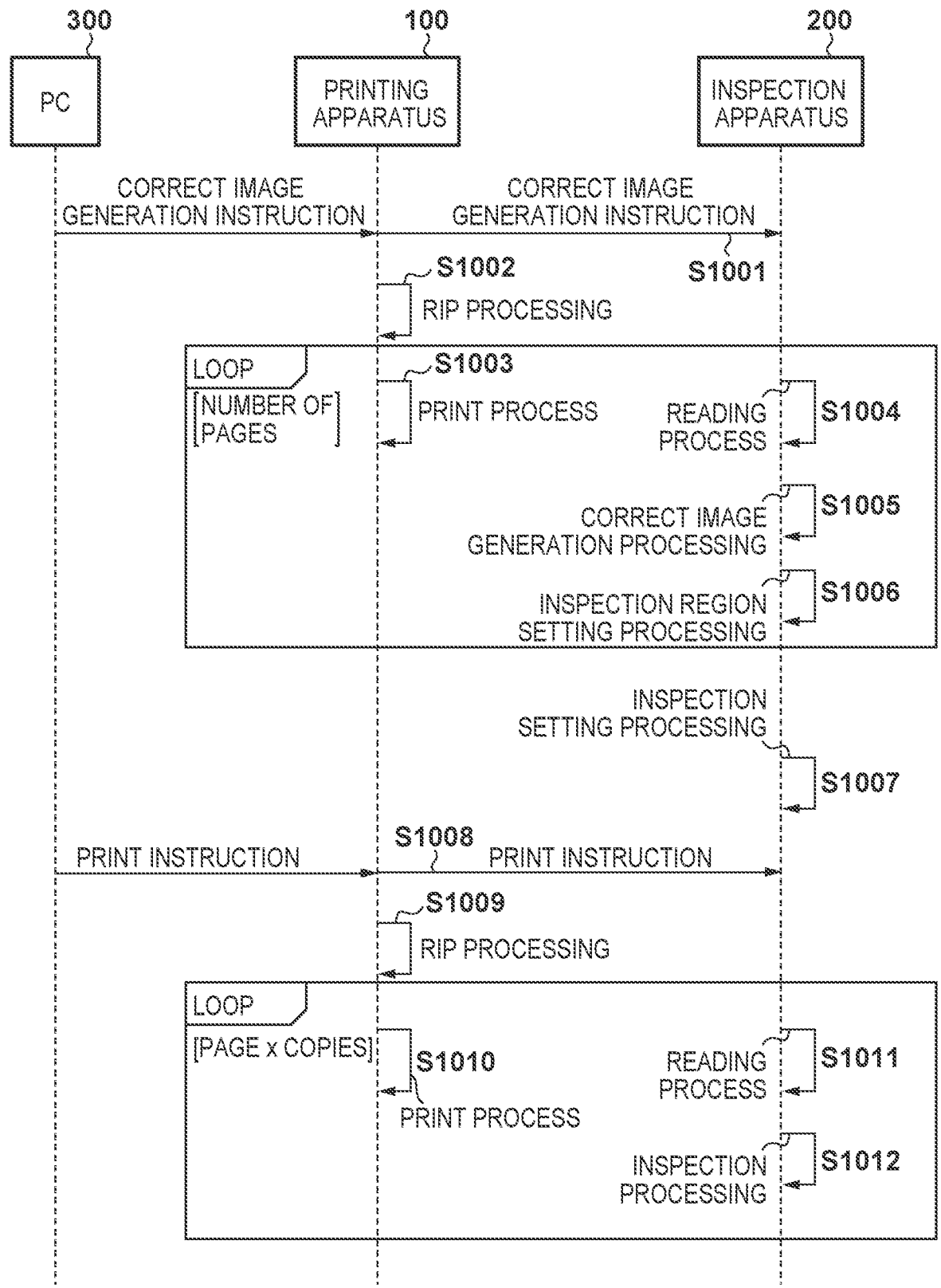
FIG. 4 is a diagram illustrating a sequence of processing according to an embodiment.
Figure 5A:
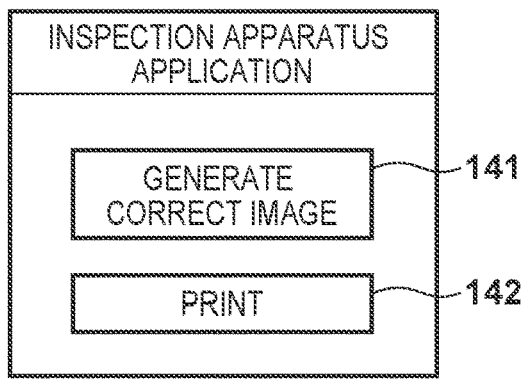
FIGS. 5A to 5C are diagrams illustrating an example of a screen of a display apparatus according to an embodiment.
Figure 5B:
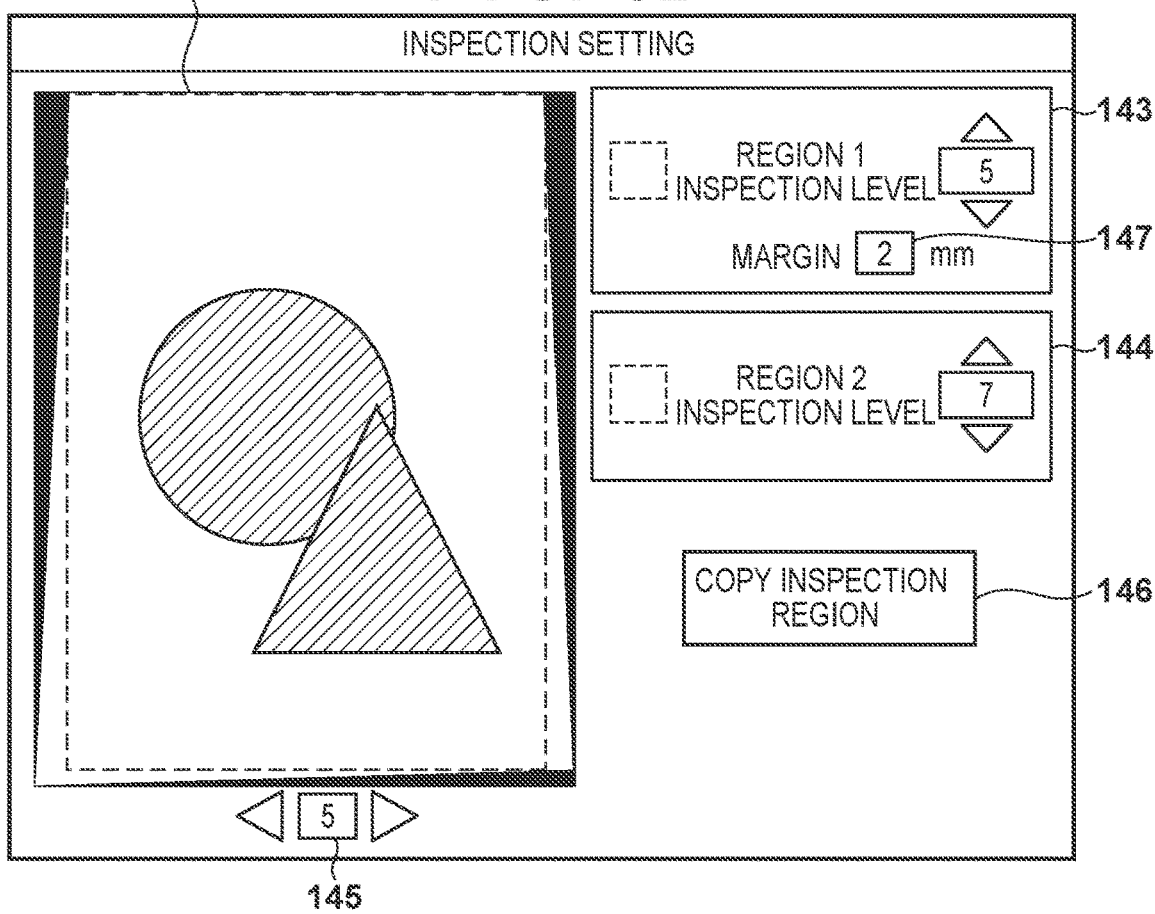

Referring next to FIG. 4 and FIGS. 5A and 5B, an inspection sequence according to the present embodiment will be described. First, a procedure for generating a correct image will be described. FIG. 5A is a screen displayed on the display 205 of the PC 300. Reference numeral 141 denotes a correct image generation button.

First, in step S1001, when the CPU 201 of the PC 300 detects that the generation button 141 is pressed by the image generation instruction unit 121, it notifies the printing apparatus 100 and the inspection apparatus 200 of an instruction to generate a correct image. The inspection apparatus 200 may be instructed via the printing apparatus 100, or may be directly instructed. Next, in step S1002, the CPU 222 of the printing apparatus 100 executes an RIP process by the RIP unit 124. The RIP process is a process of converting image data, such as PDF data, stored in a storage region of the printing apparatus 100 into a bitmap image. In step S1002, bitmap images corresponding to one copy of a print job are generated and stored in the HDD 221 of the printing apparatus 100.

Next, in step S1003, the CPU 222 of the printing apparatus 100 executes a printing process by the printing unit 125. In the printing process, RIP images stored in the storage region in step S1002 are read, and printing is performed. Specifically, the printing unit 125 feeds a print sheet of the sheet feeding unit 106 into the machine and performs the printing process. Further, the print unit 125 performs a halftoning process or the like for RIP images of four colors (CMYK), and then causes color material to be placed on the intermediate transfer belt 108 to form an image at each of the stations 101 to 104 according to signal values. The formed images are transferred onto the print sheet and conveyed through the sheet conveyance path 115 to directly under/directly above the front and back line sensor units 240a and 240b of the inspection apparatus 200.

Thereafter, in step S1004, the CPU 238 of the inspection apparatus 200 uses the line sensor units 240a and 240b to read the print sheet (printed material) whose front and back sides are printed in step S1003, converts the print sheet into image data, and generates a correct image by the image generation unit 129 in step S1005. Specifically, the CPU 238 stores the front and back image data read in step S1005 in a storage region of the inspection apparatus 200 as RGB bitmap images. Next, in step S1006, the CPU 238 executes setting of the inspection region by the inspection region setting unit 132. The inspection region setting unit 132 determines an initial setting of an inspection region in which the entire print sheet in the bitmap image generated in step S1005 can be inspected. Further, when the initial setting is determined, the inspection region setting unit 132 displays the bitmap image and the inspection region on the display unit 241 of the inspection apparatus 200 as illustrated in FIG. 5B. Details of the inspection region setting unit 132 will be described later. If the bitmap images generated in step S1002 are an original having a plurality of pages, the processing of step S1003 to step S1006 is repeatedly executed according to the number of pages.

Next, in step S1007, the CPU 238 executes a process by the inspection setting unit 130 while the display 205 of the PC 300, the keyboard 204, and other input devices are being used. The inspection setting unit 130 causes the display 205 of the PC 300, the display unit 241 of the inspection apparatus 200, or the like, to display a setting screen on, and stores the setting content received from the user in the memory 239 or the HDD 255 of the inspection apparatus 200.

(Inspection Setting Procedure)

Details of the inspection setting procedure will now be described. FIG. illustrates an example of the inspection setting screen. The inspection setting screen is displayed on the display unit 241 of the inspection apparatus 200 by the CPU 238, and includes an inspection image display unit 149, display components 143 and 144, and a button 146. Therefore, the CPU 238 is an exemplary display control unit. The inspection setting screen may be displayed on the PC 300 or a display unit of the printing apparatus 100 so as to be operable. An inspection target image read by the line sensor units 240a and 240b is displayed on the inspection image display unit 149, and a specified inspection region is displayed in a superimposed manner. A page feed component 145 can accept a user input by a mouse or the like to specify a page, and can switch the display of the inspection target image to the designated page.

In the display component 143 an example (dashed line) for distinguishing on the screen an inspection frame for an inspection region 1, a label name, and an inspection level are displayed, and the inspection level can be set in stages from 1 to 9. The smaller the number of the inspection level, the simpler the inspection is, and the larger the number, the more detailed the inspection is. That is, the inspection levels indicate levels at which abnormalities are detected. A simple inspection is, for example, a setting where the inspection does not fail even if the inspection apparatus 200 detects a small amount of dust or a small streak. Further, a detailed inspection is a setting where the inspection is determined to fail when the inspection apparatus 200 detects a small amount of dust or a thin streak. For example, an inspection level indicates a size of dust or a streak where dust or a streak exceeding that size is to be detected as an abnormality.

For example, the inspection region 1 illustrated in FIG. 5B is a maximum inspection region that is automatically set as an initial value, and the inspection region 1 is determined by the inspection region setting unit 132. The inspection region 1 is exemplified in detail in FIG. 7A; since it is a rectangular frame, the entire size of the rectangle can be easily changed in accordance with a user input of a point inside of the four corners thereof via an input device such as a mouse. Further, in the inspection region 1, it is possible to set a margin indicating a predetermined margin from an outer shape outside the inspection target, and the display component 143 includes a margin setting unit 147. Here, "2 mm" is displayed as the margin so as to be settable.

In the display component 144, an example (dashed line) for distinguishing on the screen an inspection frame for an inspection region 2, a label name, and an inspection level are displayed, and the inspection level can be set in stages from 1 to 9. Here, an individual partial region (inspection region 2) to be inspected with a raised inspection level can be additionally set. The button 146 receives an instruction to copy, by the inspection setting copy unit 133, the setting contents of an inspection region that is set in relation to the predetermined correct image as setting contents for another correct image. Details of the inspection setting copy process will be described later.

(Inspection Processing Procedure)

Next, inspection of the printed material will be described. Upon detecting that the print button 142 in FIG. 5A is pressed, the CPU 201 of the PC 300 transmits a print instruction (inspection job) to the printing apparatus 100 and the inspection apparatus 200 by the print instruction unit 122 in step S1008. Here, although the pressing of the print button 142 is described as the trigger of an inspection job, the present invention is not intended to be limited thereto, and configuration may be taken such that the inspection job is started when an arbitrary button or the like is operated through a user interface of one of the apparatuses.

Next, in step S1009, the CPU 222 of the printing apparatus 100 executes an RIP process by the RIP unit 124. The RIP unit 124 generates RIP images in the same manner as the above-described step S1002, and stores the images in the HDD 221 of the printing apparatus 100 or the memory 223. However, the RIP unit 124 may perform control to read a RIP image stored in step S1002 from the HDD 221 or the memory 223. Step S1010 and step S1011 are similar processes to the print process of step S1003 and the reading process of step S1004 described above, and therefore they will not be described.

Next, in step S1012, the CPU 238 of the inspection apparatus 200 executes an inspection process by the inspection unit 131. In the inspection process, the inspection is executed in accordance with the setting of the content of the inspection performed on the respective pages in step S1007. Specifically, the inspection unit 131 reads, from a memory or the like, a correct image of the same page generated by the image generation unit 129 in the inspection region set in the inspection setting process, and compares the correct image with the read inspection target image. When a difference between the correct image and the inspection target image is detected, the printed print sheet is discharged to the discharge unit 113, which is for purging. On the other hand, if a difference is not detected, the sheet is discharged to the normal sheet discharge unit 112.

Note that any method can be applied to alignment, tilt correction, difference detection, and the like for detecting a difference between the correct image and the inspection target image, and the present invention does not limit these methods. For the processing of step S1010 to step S1012, a repetitive process of the number of pages in the RIP process of step S1009 and the number of copies in the print instruction of step S1008 is executed.

<Inspection Region Setting Processing>

Figure 6:
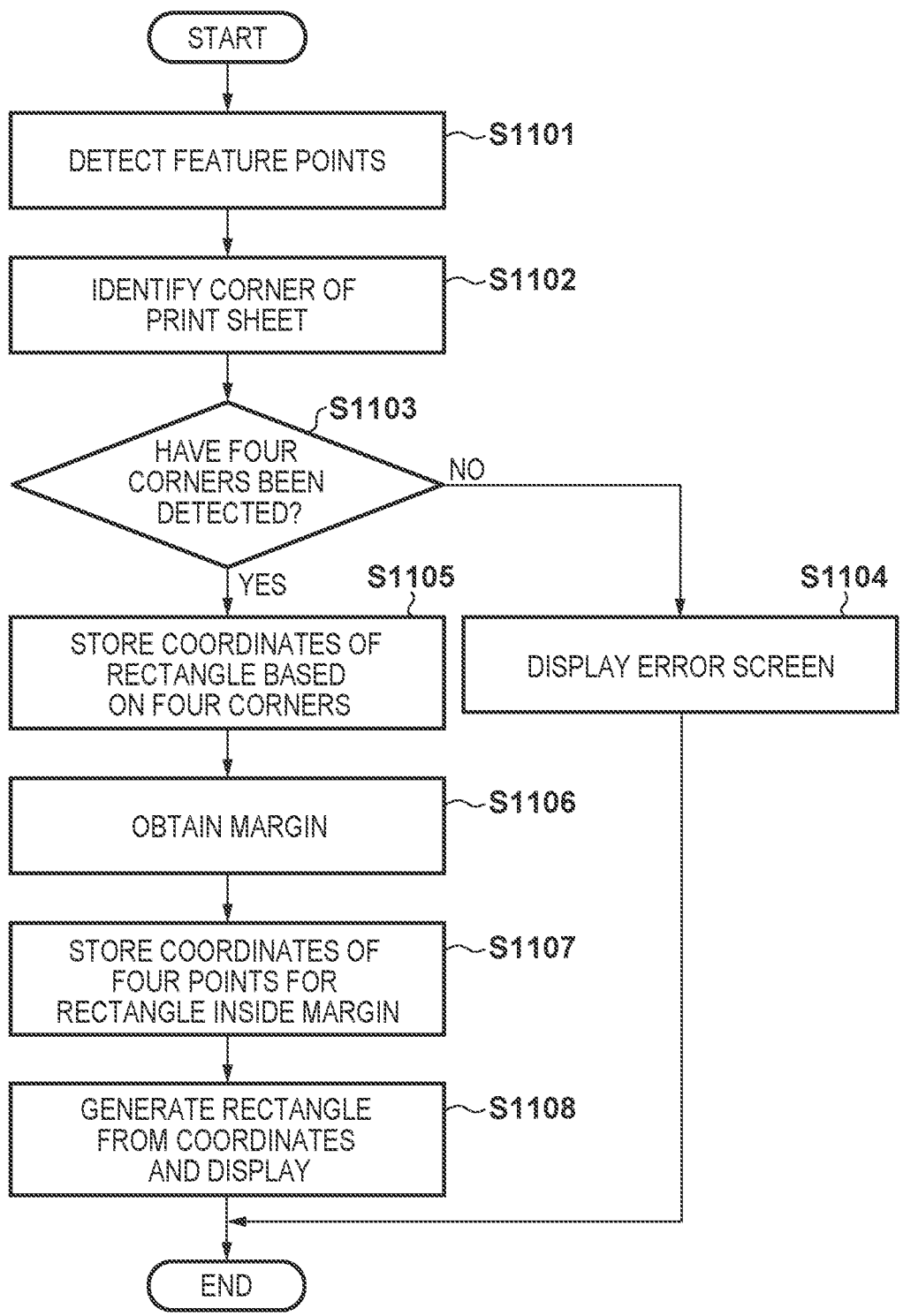
FIG. 6 is a flowchart illustrating a processing procedure of the inspection region setting processing according to the embodiment.
Figure 7A:
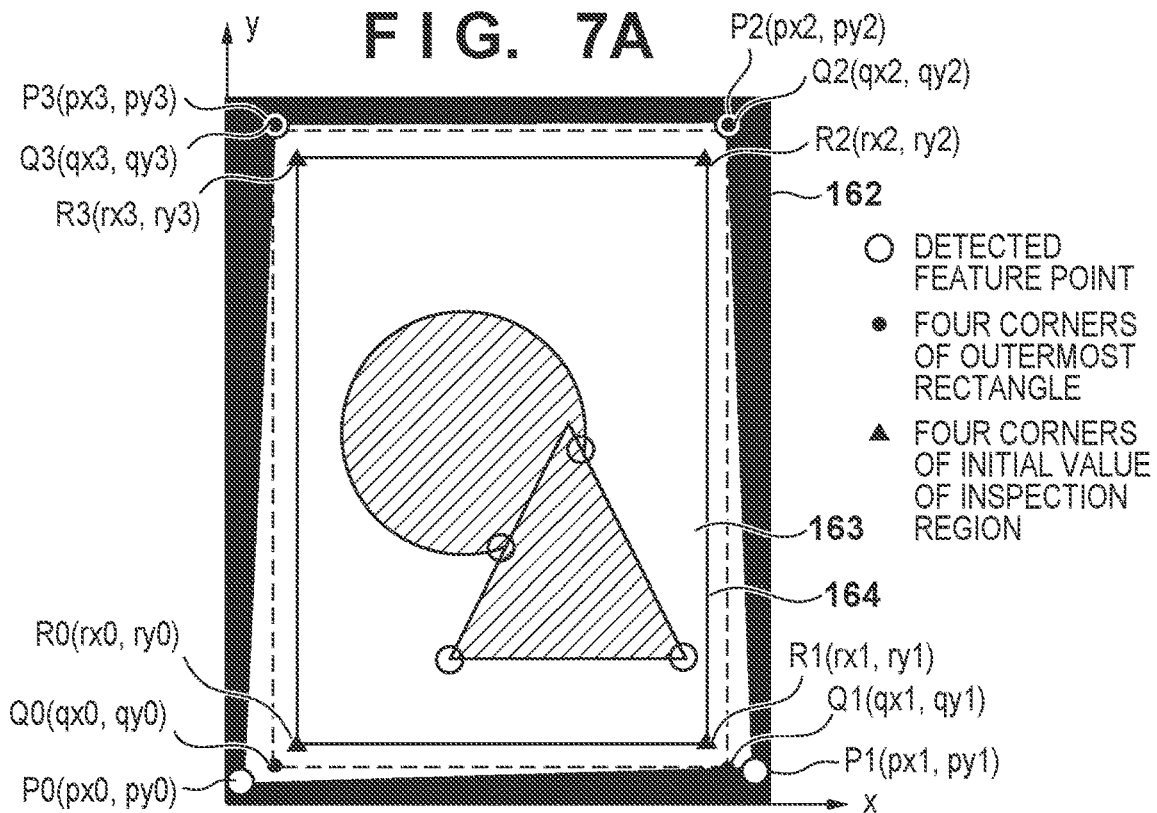
FIG. 7A and FIG. 7B are schematic diagrams illustrating inspection region setting processing according to an embodiment.
Figure 7B:
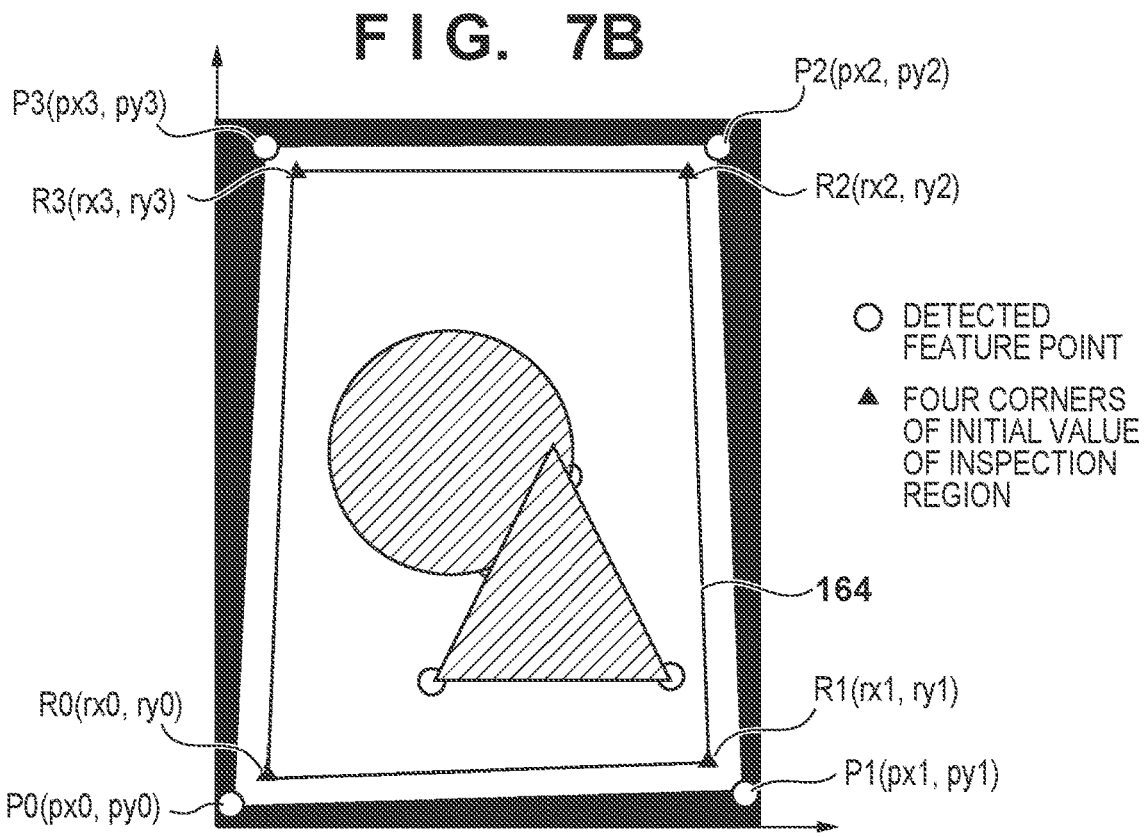

Next, referring to FIG. 6 and FIGS. 7A and 7B, a processing procedure by the inspection region setting unit 132 for step S1007 according to the present embodiment will be described. This process is a process for determining an inspection frame for inspecting an entire print sheet in the inspection setting. The process described below is realized by, for example, the CPU 238 of the inspection apparatus 200 reading and executing a control program stored in advance in the memory 239 or the HDD 255.

First, in step S1101, the CPU 238 detects feature points of the correct image generated in step S1005. FIG. 7A shows a schematic view of a print sheet scanned by the line sensor units 240a and 240b. For the sake of explanation, an example is given in which pixel positions of the scanned image are in (x, y) coordinates. In addition, in order to detect the four corners of the sheet, the sheet conveyance path 115, which constitutes a region outside of the print sheet, is preferably a darker color than the print sheet, and in FIG. 7A, a region 163 of the print sheet image and a region 162 of the image outside of the print sheet are distinguished from each other.

In step S1101, the CPU 238 detects feature points (open circles) of the scanned image using a feature point detection algorithm such as a Harris corner detector. Next, in step S1102, the CPU 238 identifies the feature points detected at the outermost points among the feature points detected in step S1101 as the four corners of the print sheet, and extracts the coordinates (first coordinate group) of P0 to P3. Then, in step S1103, the CPU 238 confirms whether the four corners (P0 to P3) have been detected in accordance with the following equations.

$$|\sqrt{(px0-px1)^2+(py0-py1)^2}-size\_w| \leq thresh$$

$$|\sqrt{(px1-px2)^2+(py1-py2)^2}-size\_h| \leq thresh$$

$$|\sqrt{(px2-px3)^2+(py2-py3)^2}-size\_w| \leq thresh$$

$$|\sqrt{(px3-px0)^2+(py3-py0)^2}-size\_h| \leq thresh \quad \text{(Equations 1)}$$

size_w: The size of the print sheet in the x-direction.
size_y: The size of the print sheet in the y-direction.
thresh: The tolerable misalignment.

The CPU 238 makes the determination using the above equations because the size of the print sheet printed by the printing apparatus 100 is known. For example, in the case of A4 size, since the distance of P0 to P1 in FIG. 7A is 210 mm in the x-axis direction and the distance of P0 to P3 is 297 mm in the y-axis direction, size_w=210 mm and size_h=297 mm. In addition, since the positional deviation of approximately 5 mm must be tolerated, thresh=5 mm.

Figure 5C:
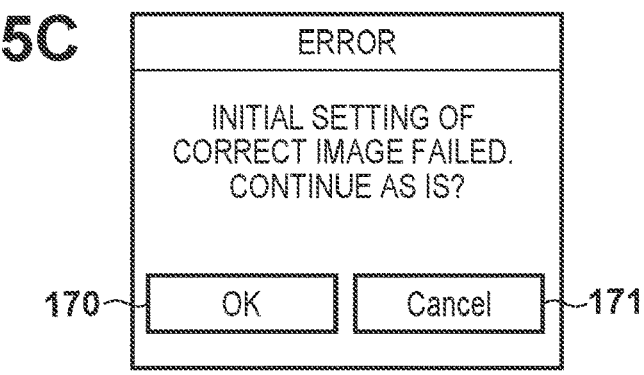

If it is determined in step S1103 that the four corners of the print sheet are correctly detected, the process proceeds to step S1105, and if not, the process proceeds to step S1104. In step S1104, the CPU 238 displays an error screen on the display unit 241. The error screen may be displayed on the PC 300 or a display unit of the printing apparatus 100. FIG. 5C illustrates an example of the error screen. Whether the pressing of an OK button 170 is confirmed or the pressing of a cancel button 171 is confirmed on this screen, the process (step S1006) of FIG. 6 ends. However, if the OK button 170 is pressed, the process proceeds to step S1007 as is, whereas if the cancel button 171 is pressed, the process is repeated from the print process of step S1003.

In step S1105, the CPU 238 generates a rectangle from the four corners of the print sheet detected in step S1103 and stores the rectangle in the memory 239 or the HDD 255. The rectangle generated here is exemplified as Q0 to Q3 in FIG. 7A. Q0 to Q3 (the rectangle) are obtained by the following equations using P0 to P3 (four corners of the print sheet).

$Q0$:

$qx0 = \max(px0, px3)$ $qy0 = \max(py0, py1)$ $Q1$:

$qx1 = \min(px1, px2)$ $qy1 = qy0$ $Q2$:

$qx2 = qx1$ $qx2 = \min(py2, py3)$ $Q3$:

$qx3 = qx0$ $qy3 = qy2$ (Equations 2)

py0 to py3 and qy0 to qy3 are the y-axis coordinates of the respective points.

px0 to px3 and qx0 to qx3 are the x-axis coordinates of the respective points.

max( )/min( ) are functions that select the maximum value/minimum value from among the arguments.

In step S1106, the CPU 238 obtains a margin indicated by a predetermined value. Here, the margin is a setting of how many millimeters to the inside from the inscribed outermost rectangle including the edge region of the print sheet the inspection region is to be set by. The user interface of FIG. 5B may be provided with an input unit, and the margin setting may be obtained thereby. In addition, configuration may be such that the user interface is not provided and instead the margin is changed by using a fixed value or a table according to the thickness of the print sheet. In a case where the print sheet is thin, in particular, the edge portion of the print sheet will float when the original is read. In addition, when the print sheet is thick, the read image of the edge portion of the print sheet tends to become black due to shadow, light wrapping, or the like. These tend to change every time a print sheet is read, and a positional deviation of the print sheet tends to occur over a wide range centered on the edge portion of the print sheet. Therefore, values in accordance with the following table are adopted. However, in the case of using Table 1, it is necessary to transfer the basis weight from the printing apparatus 100 to the inspection apparatus 200 as the information of the print sheet.

TABLE 1

| BASIS WEIGHT OF PRINT SHEET (g/m^2) | MARGIN (mm) |
| --- | --- |
| 60 to 80 | 3.5 |
| 81 to 120 | 2.5 |
| 121 to 180 | 2.5 |
| >=181 | 3.5 |

Next, in step S1107, the CPU 238 changes the coordinates of Q0 to Q3 determined in step S1105 to the inside of the margin obtained in step S1106, and obtains the coordinates (second coordinate group) of R0 to R3 in accordance with the following equations.

$R0(rx0, ry0) = (qx0+m, qy0+m)$ $R1(rx1, ry1) = (qx1-m, qy1+m)$ $R2(rx2, ry2) = (qx2-m, qy2-m)$ $R3(rx3, ry3) = (qx3+m, qy3-m)$ (Equations 3)

m: margin value (used after conversion to image coordinate system)

qy0 to qy3 and ry0 to ry3 are the y-axis coordinates of the respective points.

qx0 to qx3 and rx0 to rx3 are the x-axis coordinates of the respective points.

In step S1108, the CPU 238 superimposes the rectangular frame on the correct image and displays on the inspection image display unit 149 using the four points determined in step S1107, and ends the process of this flowchart. Further, the CPU 238 stores the obtained R0 to R3 in the memory 239 or the HDD 255. FIG. 7A illustrates a display example of the inspection region 164 using R0 to R3.

<Inspection Setting Copy Process>

Next, the processing procedure of the inspection setting copy process according to the present embodiment will be described with reference to FIG. 8. The process described below is realized by, for example, the CPU 238 of the inspection apparatus 200 reading and executing a control program stored in advance in the memory 239 or the HDD 255.

In step S1201, the CPU 238 determines whether to copy the setting of the inspection region for a plurality of pages included in the inspection job. For example, if the correct image included in the inspection job is one page, then there is no other page, and the inspection region is not copied, and thus the processing of this flowchart is ended. On the other hand, if there are a plurality of pages of correct images and the inspection region can be copied, the process proceeds to step S1202.

In step S1202, the CPU 238 obtains the rectangle coordinates R0 to R4 for all of the pages generated by the inspection region setting unit 132 from the memory 239 or the HDD 255. Next, in step S1203, the CPU 238 re-generates the rectangle so as to be the innermost of those of all the pages, and stores the re-generated coordinates (third coordinate group) in the memory 239 or the HDD 255. That is, the CPU 238 re-generates a rectangular region by extracting a third coordinate group that is innermost among the second coordinate groups of the pages.

Next, in step S1204, the CPU 238 copies, to the inspection settings for all of the pages, the coordinates of the inspection regions 1 and 2 and the inspection level set in the inspection image display unit 149 when the inspection region copy button 146 is pressed, and stores the copied coordinates in the memory 239 or the HDD 255. Coordinates of at least one of the inspection regions 1 and 2 and the inspection level may be copied. Alternatively, the selected inspection region and the inspection level of the inspection regions 1 and 2 set in the inspection image display unit 149 may be copied. Then, in step S1205, the CPU 238 re-displays the coordinates generated in step S1203 and in step S1204 and the inspection settings on the inspection setting screen of FIG. 5B, and ends the process of this flowchart.

As described above, the inspection apparatus according to the present embodiment obtains the correct image for comparison with the inspection target image read from the print sheet, and extracts the first coordinate group indicating an edge outside the correct image from feature points of the correct image. Further, the inspection apparatus extracts a second coordinate group indicating an inspection region inside the correct image that does not include the first coordinate group of the extracted correct image. More specifically, the inspection apparatus extracts a first coordinate group corresponding to the four corners of the correct image as an edge, identifies a rectangular region including the first coordinate group of the four corners, and extracts a second coordinate group indicating an inspection region that is a predetermined value to the inside of the rectangular region. As described above, according to the present embodiment, by detecting the four corners of the print sheet at the time of setting the inspection region and setting the inspection region, as an initial value, to a rectangular shape to the inside from the four corners, it is possible to set an inspection region for avoiding overdetection while having a maximum inspectable region as the inspection frame. For example, as compared with a case where an excluded region is determined uniformly from the outer shape of a correct image and the inside of the exclusion region is set as the inspection region, it is possible to easily perform a setting so as to both widen the inspection region and avoid overdetection.

Second Embodiment

Figure 9:
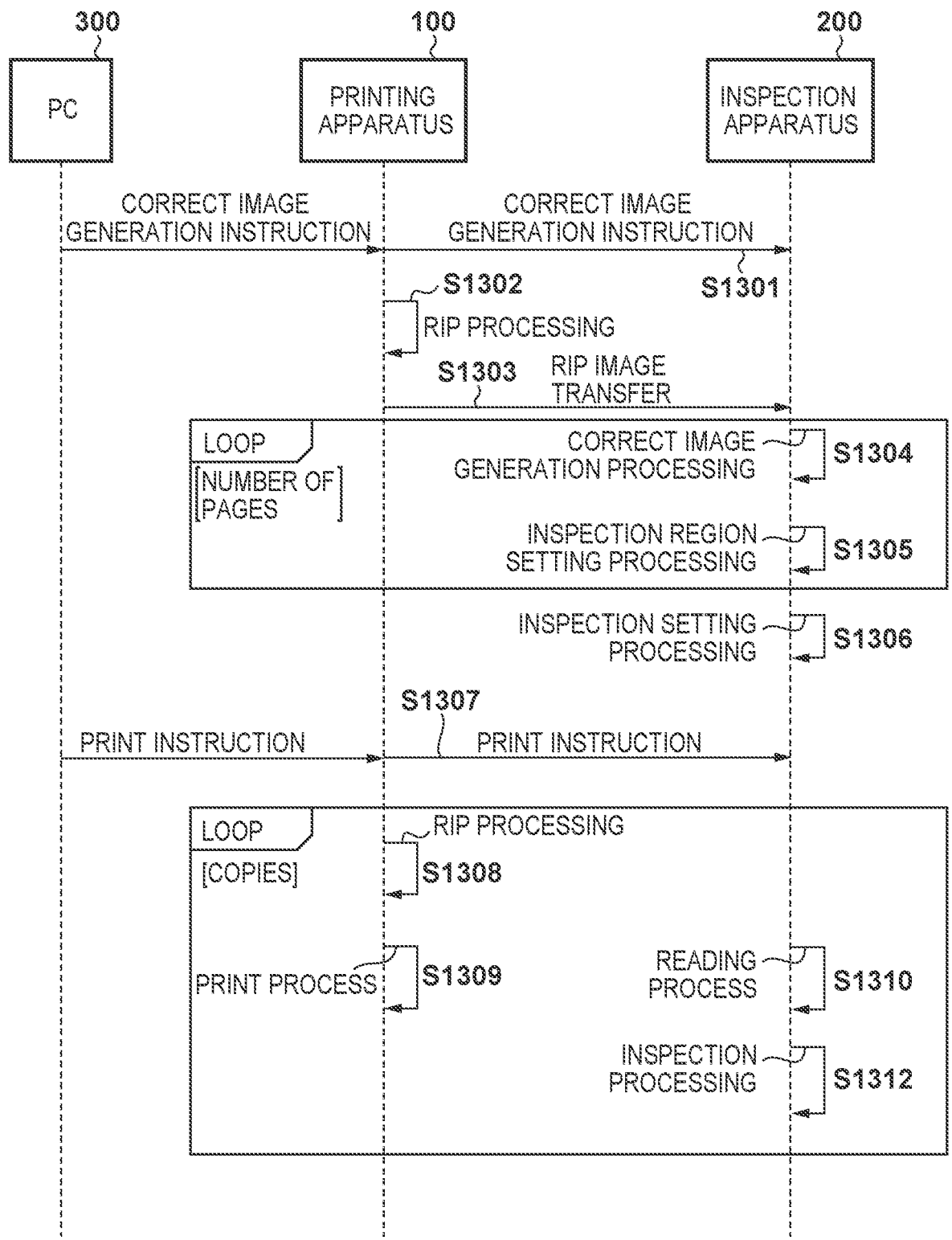
FIG. 9 is a diagram illustrating a sequence of processing according to an embodiment.

Hereinafter, a second embodiment of the present invention will be described. In the present embodiment, another example of the inspection region setting method will be described. In the present embodiment, unlike the above-described first embodiment, a quadrilateral to be an inspection region is specified from the coordinates of four corners of a correct image without specifying a rectangular region inscribed in the correct image. In the present embodiment, only differences from the above-described first embodiment will be described, and description of similar configurations and control will be omitted. First, a sequence according to the present embodiment will be described with reference to FIG. 9. step S1301 and step S1302 is processing similar to that of step S1001 and step S1102 of FIG. 4, and therefore is omitted.

In step S1303, the CPU 222 of the printing apparatus 100 transfers a RIP image (bitmap image) generated in step S1302 to the inspection apparatus 200. Here, if there are a plurality of pages of RIP images, the CPU 222 transfers the plurality of pages of images in a single transfer. Next, in step S1304, the CPU 238 of the inspection apparatus 200 executes a process of generating the correct image. In the process of generating the correct image, a RIP image transferred in step S1303 needs to be similar to a read image of the image sensor 110. For example, image processing such as deformation processing and color conversion processing using an affine transform or the like is performed. After the image is processed, the image is stored in RGB bitmap image format in the memory 239 or the HDD 255. In the present embodiment, an example is given in which the correct image is generated from the RIP image, but a scanned image read from a predetermined printed material may be used as in the above-described first embodiment. Conversely, even in the above-described first embodiment, the correct image may be generated using a RIP image as in the present embodiment.

Next, in step S1305, the CPU 238 executes processing for setting the inspection region by the inspection region setting unit 132. Specifically, the inspection region setting unit 132 determines an initial setting of an inspection region in which the entire print sheet in the bitmap image generated in step S1304 can be inspected. Further, when the initial setting is determined, the bitmap image and the inspection region are displayed on the display unit 241 of the inspection apparatus 200 as illustrated in FIG. 5B. Details of the processing performed by the inspection region setting unit 132 according to the present embodiment will be described later.

If the bitmap images generated in step S1302 are an original having a plurality of pages, the processing of step S1304 to step S1305 is repeatedly executed according to the number of pages. The processing of step S1306 is the same as step S1007 process, and therefore is omitted. However, in the inspection region 1 in FIG. 5B, one of the four corners can be operated in the inspection region setting unit 132 using an input device such as a mouse, as is illustrated in detail in FIG. 7B. That is, since the rectangle can be deformed, it is possible to set a more optimal inspection frame. The processing of step S1307 to step S1312 is the same as the processing of step S1008 to step S1012 and therefore is omitted.

<Inspection Region Setting Processing>

Figure 10:
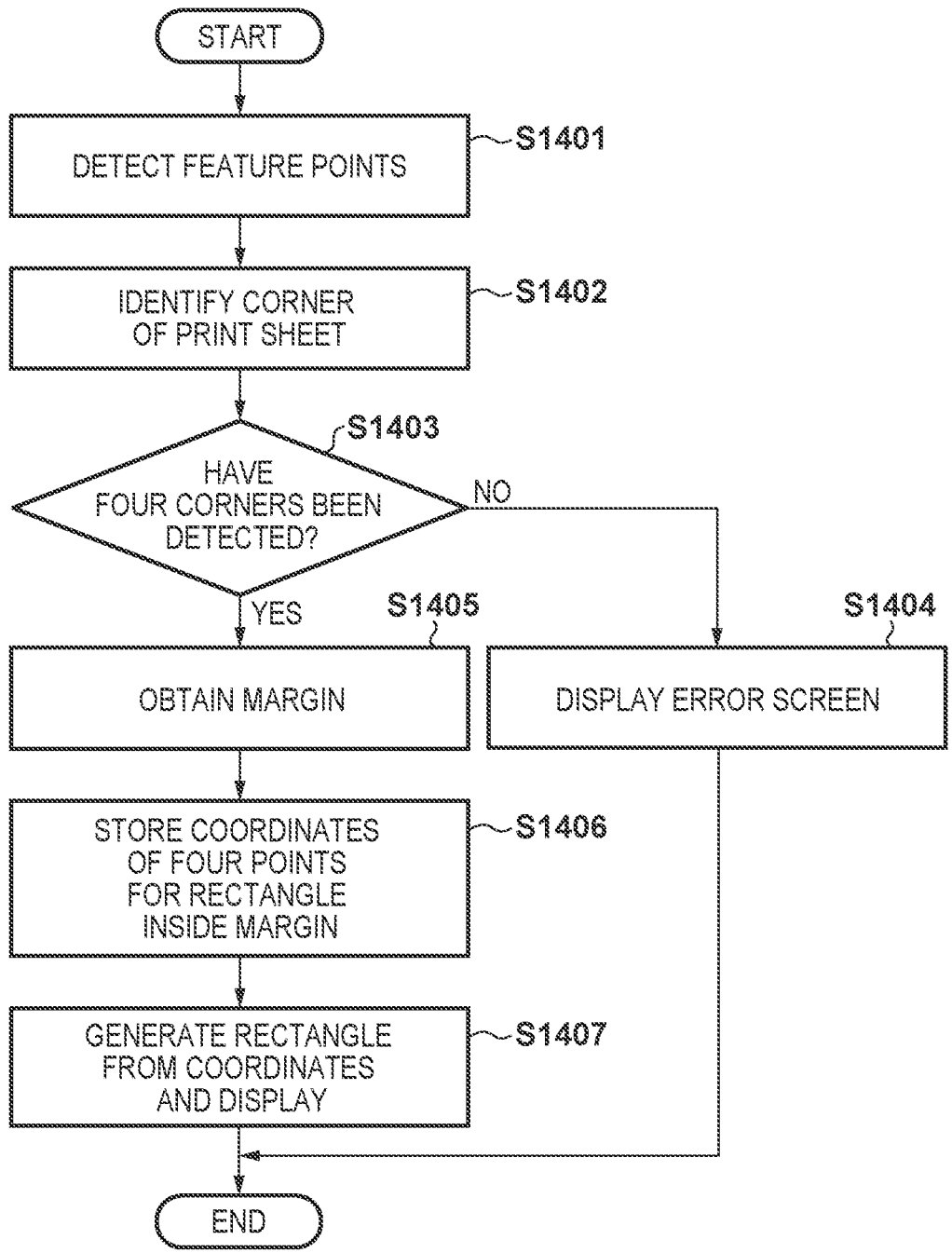
FIG. 10 is a flowchart illustrating a processing procedure of the inspection region setting processing according to the embodiment.

Next, referring to FIG. 10, a detailed processing procedure by the inspection region setting unit 132 for step S1305 in the present embodiment will be described. This process is a process for determining an inspection frame for inspecting an entire print sheet in the inspection setting. The process described below is realized by, for example, the CPU 238 of the inspection apparatus 200 reading and executing a control program stored in advance in the memory 239 or the HDD 255.

Step S1401 and step S1404 is processing the same as that of step S1101 and step S1104, and therefore is omitted. Note that P0 to P3 (first coordinate group) in FIG. 7B is the four corners of the print sheet specified in step S1402, that is, the four sides of the print sheet (correct images) are specified. Step S1405 is the same as the processing of step S1106, and therefore is omitted.

In step S1406, the CPU 238 uses P0 to P3 of FIG. 5B specified in step S1402 to generate the coordinates (second coordinate group) R0 to R3 in accordance with to the following equations.

$$R0(rx0, ry0) = (px0+m, py0+m)$$

$$R1(rx1, ry1) = (px1-m, py1+m)$$

$$R2(rx2, ry2) = (px2-m, py2-m)$$

$$R3(rx3, ry3) = (px3+m, py3-m) \quad \text{(Equations 4)}$$

m: margin value (used after conversion to image coordinate system)

py0 to py3 and ry0 to ry3 are the y-axis coordinates of the respective points.

px0 to px3 and rx0 to rx3 are the x-axis coordinates of the respective points.

Next, in step S1407, the CPU 238 displays the quadrilateral on the inspection image display unit 149 using the four points determined in step S1406. Further, the CPU 238 stores the determined R0 to R3 in the memory 239 or the HDD 255, and ends the process of this flowchart. FIG. 7B illustrates a display example of the inspection region using R0 to R3.

As described above, the inspection apparatus according to the present embodiment extracts, as an edge, a first coordinate group corresponding to the four corners of the correct image, and extracts a second coordinate group indicating an inspection region having a quadrilateral that is a predetermined value to the inside from the first coordinate group corresponding to the four sides of the correct image indicated by the four corners. As described above, according to the present embodiment, by detecting the four corners of the print sheet at the time of setting the inspection region and setting the inspection region, as an initial value, to a quadrilateral to the inside from the four corners, it is possible to set an inspection region for avoiding overdetection while having a maximum inspectable region as the inspection frame.

Third Embodiment

Hereinafter, a third embodiment of the present invention will be described. In the present embodiment, another example of the inspection region setting method will be described. In the present embodiment, unlike the above-described first embodiment and second embodiment, the edge coordinates (the first coordinate group) included in the outer four sides of the correct image are directly corrected to the inner coordinates (the second coordinate group) without specification of the rectangular region or the quadrilateral region at an intermediate step in the process of setting the inspection region. In the present embodiment, only differences from the above-described first embodiment will be described, and description of similar configurations and control will be omitted.

Figure 11:
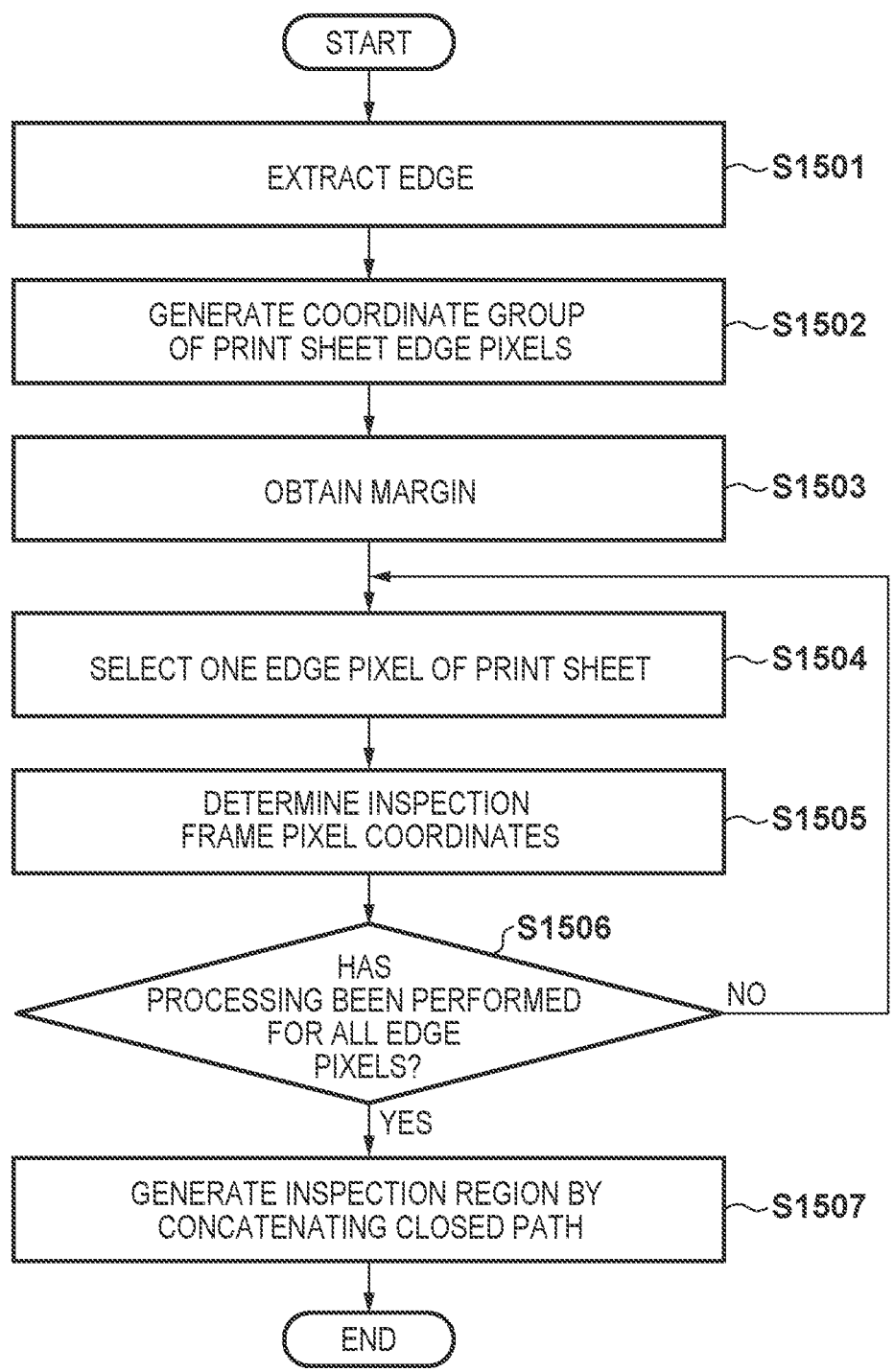
FIG. 11 is a flowchart illustrating a processing procedure of the inspection region setting processing according to the embodiment.
Figure 12A:
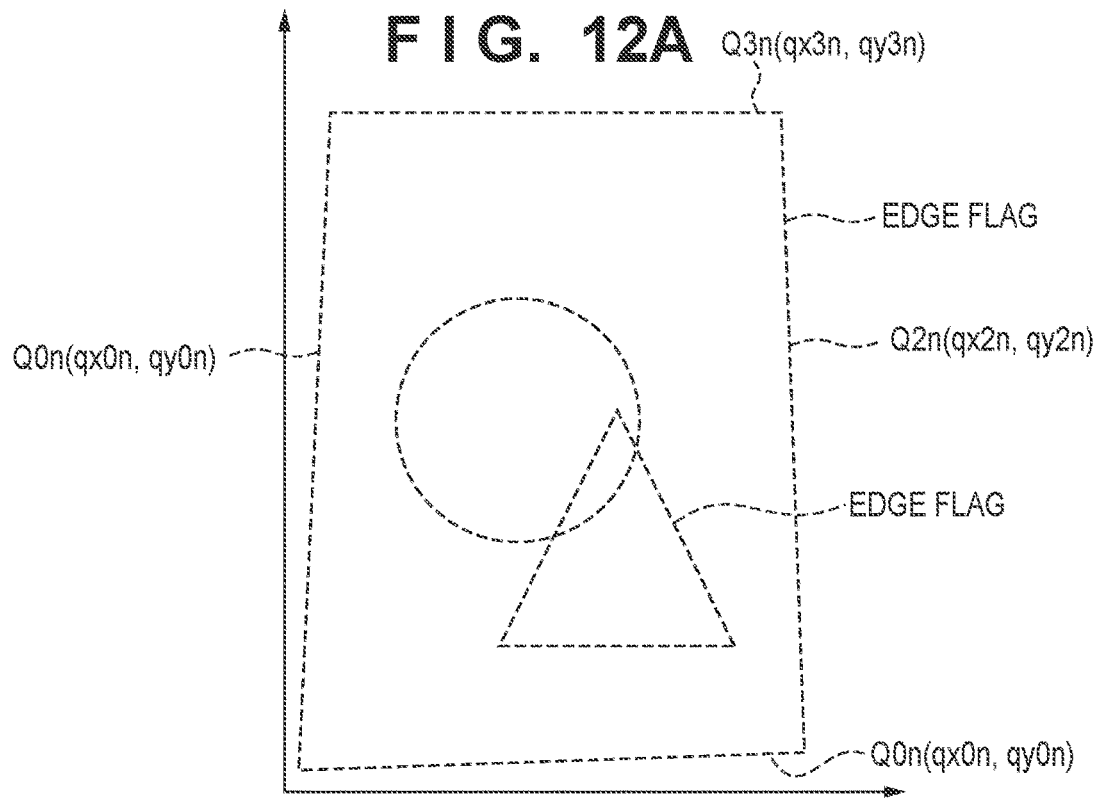
FIG. 12A and FIG. 12B are schematic diagrams illustrating inspection region setting processing according to an embodiment.
Figure 12B:
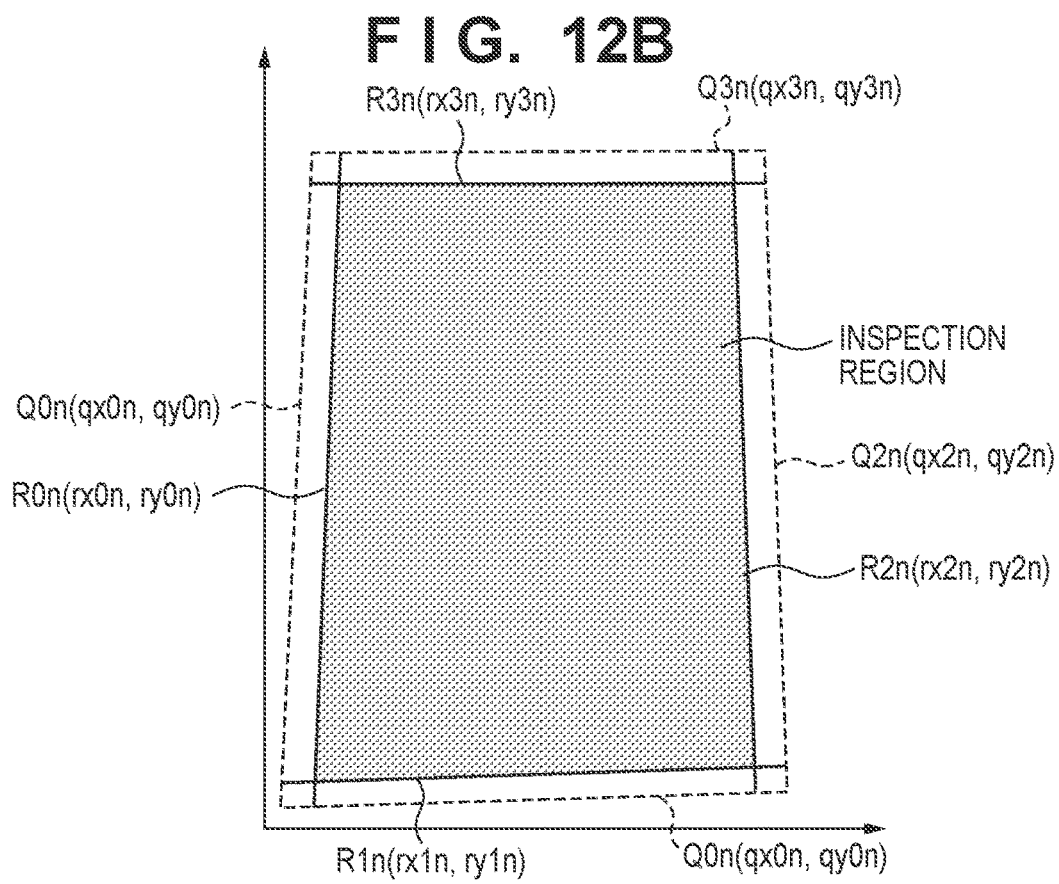

Next, referring to FIG. 11 and FIGS. 12A and 12B, a processing procedure by the inspection region setting unit 132 according to the present embodiment will be described. The process described below is realized by, for example, the CPU 238 of the inspection apparatus 200 reading and executing a control program stored in advance in the memory 239 or the HDD 255.

First, in step S1501, the CPU 238 performs edge extraction processing with edges as feature points of the correct image generated in step S1005. In the edge extraction processing, for example, a high-frequency component of an image is extracted using a differential filter such as a Sobel filter, and then a 1-bit edge flag is generated by creating an edge component flag using an appropriate binarization threshold. The edge flag image is exemplified in FIG. 12A.

Next, in step S1502, the CPU 238 obtains a coordinate group (first coordinate group) by using the outermost edge component extracted in step S1501 as the edge of the print sheet. Here, from the size of the print sheet and the position of the edge coordinates, it is distinguished which of the left side, the lower side, the right side, and the upper side of the print sheet an edge belongs to.

Left side: $Q0n(q0xn,q0yn)$

Lower side: $Q1n(q1xn,q1yn)$

Right side: $Q2n(q2xn,q2yn)$

Upper side: $Q3n(q3xn,q3yn)$ n=0 to N (the number of coordinates adopted on each side as the edge of the print sheet).

Step S1503 is the same as step S1106, and therefore is omitted. In step S1504, the CPU 238 selects one of the coordinate groups of print sheet edge pixels generated in step S1502. The coordinates to be selected here may be coordinates of any pixel on the left side, the lower side, the right side, and the upper side. Next, in step S1505, the CPU 238 determines the pixel coordinates (the second coordinate group) of the inspection frame for the pixels determined in step S1504 in the following manner, taking into account the margin value amount obtained in step S1503.

Left side: $R0n(r0xn,r0yn)=Q0n(q0xn+m,q0yn)$

Lower side: $R1n(r1xn,r1yn)=Q1n(q1xn,q1yn+m)$

Right side: $R2n(r2xn,r2yn)=Q2n(q2xn-m,q2yn)$

Upper side: $R3n(r3xn,r3yn)=Q3n(q3xn,q3yn-m)$ m: margin value (used after conversion to image coordinate system)

$ry0n$ to $ry3n$ and $qy0n$ to $qy3n$ are the y-axis coordinates of the n-th points.

$rx0n$ to $rx3n$ and $qx0n$ to $qx3n$ are the x-axis coordinates of the n-th points.

Next, in step S1506, the CPU 238 determines whether all the processes of the left side, the lower side, the right side, and the upper side of the point of the print sheet edges have been performed. If any of the processes have not been completed, the process returns to step S1504, and the process is repeated by selecting another point. If all the processes have been completed, the process proceeds to step S1507.

In step S1507, the CPU 238 obtains a closed path as an inspection region by searching for respective points that constitute $R0n$, $R1n$, $R2n$, and $R3n$, which are the points of the inspection frame generated in step S1504 to step S1506, and ends the process of this flowchart. After the closed path is detected, it is determined as the inspection region as illustrated in FIG. 12B. In FIG. 12B, the positional relationship between the respective points is illustrated.

As described above, the inspection apparatus according to the present embodiment extracts, as an edge, a first coordinate group including at least one pair of coordinates on each side of the four sides of the correct image, and extracts a second coordinate group indicating the inspection region that is coordinates a predetermined value to the inside from the first coordinate group. As described above, according to the present embodiment, it is possible to set an inspection region for avoiding overdetection while using up to the maximum inspectable area as an inspection frame by a method of obtaining coordinates inside a prescribed portion from the edge after performing the edge extraction processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-111341, filed Jul. 11, 2022, which is hereby incorporated by reference herein in its entirety.

What is claimed is:

1. An inspection apparatus comprising:
a memory storing instructions; and
a processor that implements the instructions to:
obtain a correct image for comparison against an inspection target image read from a print sheet;
extract a first coordinate group indicating an outside edge of the correct image from a feature point of the correct image, wherein the first coordinate group corresponds to four corners of outside edges of the correct image;
identify a rectangular region including the first coordinate group of the four corners; and
extract a second coordinate group indicating an inspection region, which is disposed inside a predetermined value from the rectangular region.

2. The inspection apparatus according to claim 1, wherein the processor implements the instructions to further control a display to display:
the inspection region superimposed on the correct image; and
a setting screen that allows the inspection region to be changeable in accordance with a user input.

3. The inspection apparatus according to claim 2, wherein in the setting screen, the predetermined value is settable in accordance with the user input.

4. The inspection apparatus according to claim 2, wherein in the setting screen, a level at which to detect an abnormality in an inspection is settable in accordance with the user input.

5. The inspection apparatus according to claim 4, wherein in the setting screen:
an individual partial region inside of the inspection region is settable; and
the level is individually settable for the partial region.

6. The inspection apparatus according to claim 2, wherein the setting screen allows acceptance of an instruction to copy an inspection region set for a predetermined correct image to another correct image in a state where a plurality of correct images are obtained.

7. The inspection apparatus according to claim 6, wherein:
the processor implements the instructions to further, in a state where the instruction is accepted, extract a third coordinate group that is most inward among inspection regions corresponding to respective obtained correct images, and
the inspection region includes the extracted third coordinate group.

8. The inspection apparatus according to claim 2, wherein the predetermined value is determined in accordance with a type of a print sheet on which the inspection target image is printed.

9. The inspection apparatus according to claim 8, wherein the predetermined value is determined in accordance with a basis weight of the print sheet on which the inspection target image is printed.

10. The inspection apparatus according to claim 2, wherein the processor obtains the correct image from image data obtained by reading a predetermined printed material.

11. The inspection apparatus according to claim 2, wherein the processor obtains the correct image from a RIP image for printing in a printing apparatus that prints a printed material as an inspection target.

12. The inspection apparatus according to claim 2, further comprising:
scanner that scans a printed material of an inspection target,
wherein the processor implements the instructions to further perform inspection of the inspection target image by comparing the inspection target image, which is read by the scanner, and the correct image, in accordance with the inspection region.

13. A method of controlling an inspection apparatus, the method comprising:
obtaining a correct image for comparison against an inspection target image read from a print sheet;
extracting a first coordinate group indicating an outside edge of the correct image from a feature point of the correct image, wherein the first coordinate group corresponds to four corners of outside edges of the correct image;
identifying a rectangular region including the first coordinate group of the four corners; and
extracting a second coordinate group indicating an inspection region, which is disposed inside a predetermined value from the rectangle region.

14. A non-transitory computer-readable storage medium storing a program executable by a computer to execute a method of controlling an inspection apparatus, the method comprising:
obtaining a correct image for comparison against an inspection target image read from a print sheet;
extracting a first coordinate group indicating an outside edge of the correct image from a feature point of the correct image, wherein the first coordinate group corresponds to four corners of outside edges of the correct image;
identifying a rectangular region including the first coordinate group of the four corners; and
extracting a second coordinate group indicating an inspection region, which is disposed inside a predetermined value from the rectangle region.

* * * * *